US012541710B2

(12) United States Patent
Chou et al.

(10) Patent No.: US 12,541,710 B2
(45) Date of Patent: Feb. 3, 2026

(54) COMPUTERIZED SYSTEMS AND METHODS FOR USER ACTION PREDICTION

(71) Applicant: YAHOO ASSETS LLC, Dulles, VA (US)

(72) Inventors: Shangpo Chou, Sunnyvale, CA (US); Chris Luvogt, Fort Bragg, CA (US); Neeti Narayan, Roseville, MN (US); Rao Shen, Sunnyvale, CA (US); Kostas Tsioutsiouliklis, Saratoga, CA (US)

(73) Assignee: YAHOO ASSETS LLC, New York, NY (US)

( * ) Notice: Subject to any disclaimer, the term of this patent is extended or adjusted under 35 U.S.C. 154(b) by 984 days.

(21) Appl. No.: 17/696,380

(22) Filed: Mar. 16, 2022

(65) Prior Publication Data

US 2023/0297874 A1    Sep. 21, 2023

(51) Int. Cl.
*G06N 20/00* (2019.01)
*G06N 5/04* (2023.01)
*H04L 51/18* (2022.01)

(52) U.S. Cl.
CPC ............. *G06N 20/00* (2019.01); *G06N 5/04* (2013.01); *H04L 51/18* (2013.01)

(58) Field of Classification Search
CPC .......... G06N 20/00; G06N 5/04; H04L 51/18
See application file for complete search history.

(56) References Cited

U.S. PATENT DOCUMENTS

| 2015/0213372 | A1* | 7/2015 | Shah | H04L 51/52 |
| | | | | 706/12 |
| 2019/0311295 | A1* | 10/2019 | Weber | G06F 16/2465 |
| 2021/0234813 | A1* | 7/2021 | Narayan | H04L 51/21 |

OTHER PUBLICATIONS

Aditya .P, "L1 and L2 Regularization.", Nov. 11, 2018, Medium (Year: 2018).*
Aberdeen et al., "The Learning Behind Gmail Priority Inbox," 4 pages (2010).
Bojanowski et al., "Enriching Word Vectors with Subword Information," 12 pages (2017).
Dabbish et al., "Understanding Email Use: Predicting Action on a Message," Papers: Email and Security, pp. 691-700 (2005).

(Continued)

*Primary Examiner* — Ann J Lo
(74) *Attorney, Agent, or Firm* — James J. DeCarlo; Greenberg Traurig, LLP (57) ABSTRACT

The disclosed systems and methods provide a novel action prediction framework that performs personalized action prediction. According to an embodiment, the disclosed framework is able to dynamically predict which action (if any) a user might perform in response to receiving a given message. In some embodiments, for a given message, the action prediction framework can determine the probability that a user (e.g., sender, recipient) associated with the message may perform an action or set of action actions (e.g., open, forward, delete, reply, archive) related to the message. In some embodiments, the framework may be used to suggest a predicted action to the user. In some embodiments, a computing device may use the predicted actions to automatically perform the action. According to an embodiment, the action prediction framework includes a multi-label or multi-class model using a neural network.

18 Claims, 6 Drawing Sheets

(56) References Cited

OTHER PUBLICATIONS

Dabbish et al., "Marked for Deletion: An Analysis of Email Data," Posters: Computer-Mediated Communication, pp. 924-925 (2003).
Di Castro et al., "You've got Mail, and Here is What you Could do With It! Analyzing and Predicting Actions on Email Messages," pp. 307-316 (2016).
Kingma et al., "Adam: A Method for Stochastic Optimization," pp. 1-15 (2015).
Mukherjee et al., "A Content-Based Approach to Email Triage Action Prediction: Exploration and Evaluation," pp. 1-24 (2019).
On et al., "Mining interaction behaviors for email reply order prediction," 6 pages (2010).

\* cited by examiner

COMPUTERIZED SYSTEMS AND METHODS FOR USER ACTION PREDICTION

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE DISCLOSURE

The present disclosure relates generally to improving the performance of network-based computerized communication devices, systems and/or platforms by modifying the capabilities and providing non-native functionality to such devices, systems and/or platforms through an improved framework for predicting actions performed in response to a given message.

BACKGROUND

In recent years, users of electronic communications systems have seen an explosion in the number of machine-generated messages (e.g., emails, SMS, voicemail) they receive with some estimates noting that over 90% of email traffic is currently machine-generated. Such bombardment often leads to users feeling overloaded with information which further leads to lower engagement, important messages being ignored and, often, missed altogether. Some solutions provided in the art have focused on sorting and identifying potentially unimportant messages, with little success.

Fundamentally, solutions found in the art lack an understanding of a user's particular behavior and, moreover, an understanding of the behavior of a mass of users in response to discrete senders. Additionally, most solutions in the art lack the level of granularity to accurately and precisely determine for a given message which actions a user may perform. Some approaches focus only on the recipient side, while others focus only on the sender side.

Still, some recent approaches have tried to predict actions based on single-single label machine learning algorithms on a very limited subset of users and messages due to the complexity and computational cost of such techniques in large datasets.

BRIEF SUMMARY

The present disclosure provides a novel action prediction framework that alleviates shortcomings in the art, and provides novel mechanisms for performing scalable action prediction to personalize action suggestions or automate actions on digital communications systems. As discussed herein, the disclosed framework is scalable to satisfy the much more stringent latency and computational requirements required by current network operating environments. According to some embodiments, models described herein may be periodically trained to update the accuracy and precision of the predictions in view of changing or evolving user behavior.

According to disclosed embodiments, as discussed below, an action prediction framework is provided to predict which action (if any) a user might perform in response to receiving a given message. In some embodiments, the framework may be used to suggest a predicted action to the user. In some embodiments, a computing device may use the predicted action to automatically perform the action. In some embodiments, the action is suggested to the user using a prompt in a display of the computing device. In some embodiments, the user may select an action or actions of the suggested actions using a keypad or other interface of the computing device.

According to an embodiment, the action prediction framework includes a multi-label or multi-class model using a neural network. In some embodiments, for a given message, the action prediction framework can determine the probability that a user (e.g., sender, recipient) associated with the message may perform an action or set of action actions (e.g., open, forward, delete, reply, archive) related to the message. In some embodiments, an application implementing the action prediction framework may select the actions or set of actions above a certain probability threshold.

According to an embodiment, a method of performing scalable action prediction using an action prediction framework includes identifying a message from a corpus of messages. In some embodiments, the message is related to at least one of a sender and a recipient. In some embodiments, the message includes data and metadata. The message is then analyzed to extract features related to the data and metadata. In some embodiments, action prediction framework may also use other features not-extracted from the identified message. The extracted features are processed to generate one or more feature vectors to be used as input vectors to an action prediction model of the action prediction framework. In some embodiments, the action prediction model has a plurality of sub-models corresponding to each feature vector of a plurality of feature vectors. The action prediction model is applied to the input vector or vectors to generate a prediction of which actions a user may perform in relation to the identified message. In some embodiments, the action prediction framework may calculate a probability for each action corresponding to the likelihood a user may perform a specific action or set of actions in relation to an identified message.

According to an embodiment, a method for predicting and suggesting an action to a user of a digital communications system is provided. In some embodiments, a computing device (e.g., a server) may receive, from a user's device, a request to provide a web-based portal (e.g., a web-page of an email service). The web-based portal providing access to at least one message. Upon receiving the request, the computing device may execute an application implementing the action prediction framework (including the action prediction model) to predict one or more actions related to the at least one message. Then, the computing device may provide the web-based portal including the at least one message and the one or more actions. In some embodiments, the computing device may receive a selection for the one or more actions. In some embodiments, the computing device may perform the one or more actions in response to receiving a selection for the one or more actions.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, 4th or 5th generation (2G, 3G, 4G or 5G) cellular technology, mobile edge computing (MEC), Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

As discussed herein, reference to an "advertisement" should be understood to include, but not be limited to, digital media content embodied as a media item that provides information provided by another user, service, third party, entity, and the like. Such digital ad content can include any type of known or to be known media renderable by a computing device, including, but not limited to, video, text, audio, images, and/or any other type of known or to be known multi-media item or object. In some embodiments, the digital ad content can be formatted as hyperlinked multi-media content that provides deep-linking features and/or capabilities. Therefore, while some content is referred to as an advertisement, it is still a digital media item that is renderable by a computing device, and such digital media item comprises content relaying promotional content provided by a network associated party.

According to some embodiments, information associated with, derived from, or otherwise identified from, during or as a result of an action prediction, as discussed herein, can be used for monetization purposes and targeted advertising when providing, delivering or enabling such devices access to content or services over a network. Providing targeted advertising to users associated with such discovered content can lead to an increased click-through rate (CTR) of such ads and/or an increase in the advertiser's return on investment (ROI) for serving such content provided by third parties (e.g., digital advertisement content provided by an advertiser, where the advertiser can be a third-party advertiser, or an entity directly associated with or hosting the systems and methods discussed herein).

The detailed description provided herein is not intended as an extensive or detailed discussion of known concepts, and as such, details that are known generally to those of ordinary skill in the relevant art may have been omitted or may be handled in summary fashion.

Certain embodiments will now be described in greater detail with reference to the figures.

Figure 1:
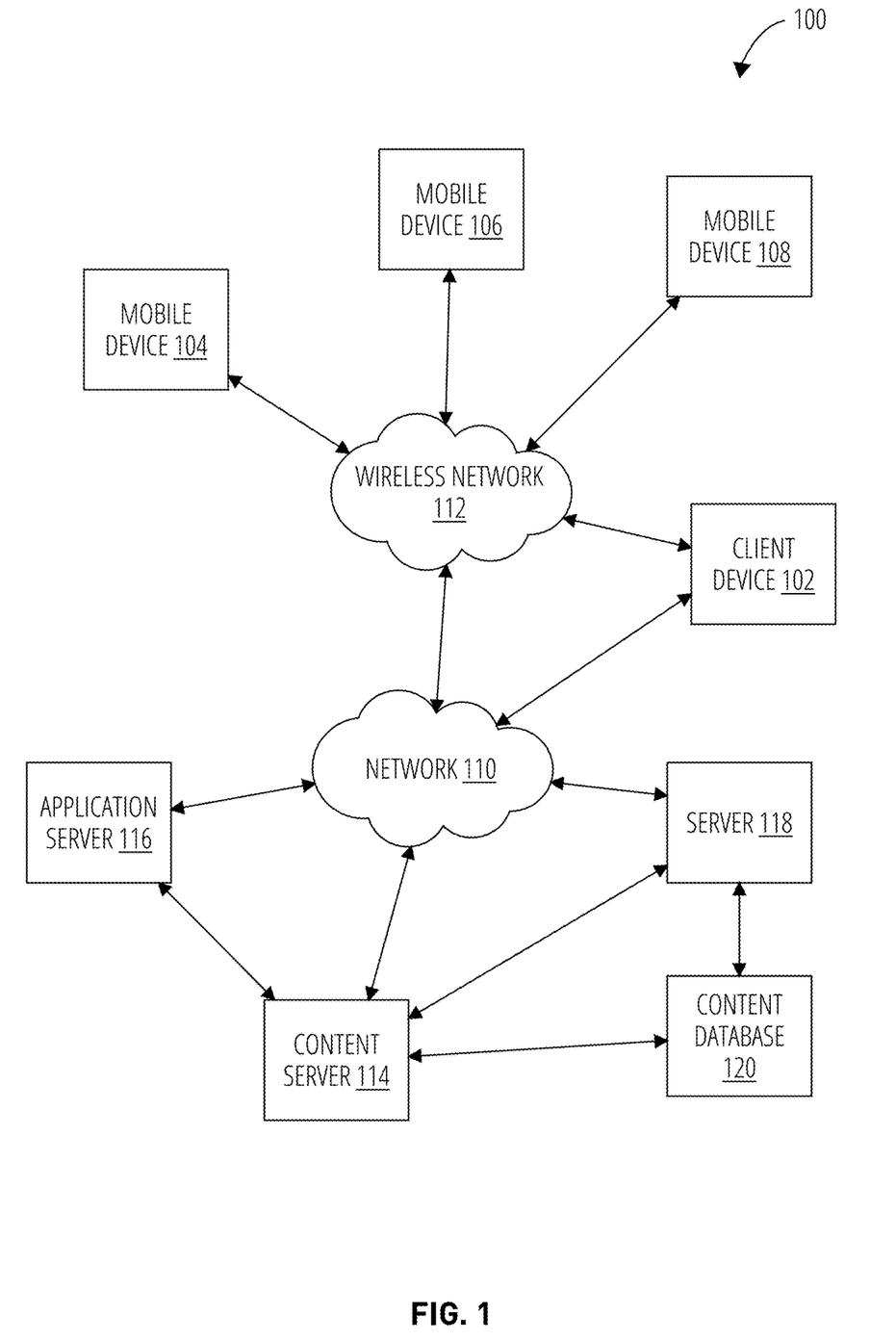
FIG. 1 depicts a schematic diagram illustrating an example of a network within which the systems and methods disclosed herein could be implemented according to some embodiments of the present disclosure.

In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")-network 110, wireless network 112, mobile devices (client device) 104-108 and client device 102. FIG. 1 additionally includes a variety of servers, such as content server 114, application ("App") server 116, and third-party servers 118.

One embodiment of mobile devices 104-108 is described in more detail below. Generally, however, mobile devices 104-108 may include virtually any portable computing device capable of receiving and sending a message over a network, such as network 110, wireless network 112, or the like. Mobile devices 104-108 may also be described generally as client devices that are configured to be portable. Thus, mobile devices 104-108 may include virtually any portable computing device capable of connecting to another computing device and receiving information, as discussed above.

Mobile devices 104-108 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 104-108 may uniquely identify themselves through any of a variety of mechanisms, including a phone number, Mobile Identification Number (MIN), an electronic serial number (ESN), or other mobile device identifier.

In some embodiments, mobile devices 104-108 may also communicate with non-mobile client device, such as client device 102, or the like. Client device 102 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 102 may also have differing capabilities for displaying navigable views of information.

Devices 102-108 may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 112 is configured to couple mobile devices 104-108 and its components with network 110. Wireless network 112 may include any of a variety of wireless sub-networks that may further overlay stand-alone ad-hoc networks, and the like, to provide an infrastructure-oriented connection for mobile devices 104-108. Such sub networks may include mesh networks, Wireless LAN (WLAN) networks, cellular networks, and the like.

Network 110 is configured to couple content server 114, App server 116, or the like, with other computing devices, including, client device 102, and through wireless network 112 to mobile devices 104-108. Network 110 is enabled to employ any form of computer readable media or network for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

In some embodiments, the disclosed networks 110 and/or 112 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 114 may include a device that includes a configuration to provide any type or form of content via a network to another device. Devices that may operate as content server 114 include personal computers, desktop computers, multiprocessor systems, microprocessor-based or programmable consumer electronics, network PCs, servers, and the like. Content server 114 can further provide a variety of services that include, but are not limited to, email services, instant messaging (IM) services, streaming and/or downloading media services, search services, photo services, web services, social networking services, news services, third-party services, audio services, video services, SMS services, MMS services, FTP services, voice over IP (VOIP) services, or the like. Such services, for example a video application and/or video platform, can be provided via the App server 116, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

Third party server 118 (in some embodiments, an "ad server") can comprise a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with the users. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is, advertisers will pay higher advertising rates when they believe their ads are being placed in or along with highly relevant content that is being presented to users. Reductions in the time needed to quantify a high-quality ad placement offers ad platforms competitive advantages. Thus, higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en-masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, gender, occupation, and the like) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation.

Where advertising analytics transmittal is not immediately available, gathered advertising analytics may be stored by an advertising presentation system until transmittal of those advertising analytics becomes available.

Servers 114, 116, and 118 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like.

In some embodiments, users are able to access services provided by servers 114, 116, and/or 118. This may include in a non-limiting example, authentication servers, search servers, email servers, social networking services servers, SMS servers, IM servers, MMS servers, exchange servers, photo-sharing services servers, and travel services servers, via the network 110 and/or wireless network 112 using their various devices 102-108.

In some embodiments, applications, such as, but not limited to, news applications (e.g., Yahoo! Sports®, ESPN®, Huffington Post®, CNN®, and the like), mail applications (e.g., Yahoo! Mail®, Gmail®, and the like), streaming video applications (e.g., YouTube®, Netflix®, Hulu®, iTunes®, Amazon Prime®, HBO Go®, and the like), instant messaging applications, blog, photo or social networking applications (e.g., Facebook®, Twitter®, Instagram®, and the like), search applications (e.g., Yahoo!® Search), and the like, can be hosted by the App server 116, or content server 114 and the like.

Thus, the App server 116, for example, can store various types of applications and application related information including application data and user profile information (e.g., identifying and behavioral information associated with a user). It should also be understood that content server 114 can also store various types of data related to the content and services provided by content server 114 in an associated content database 120, as discussed in more detail below. Embodiments exist where the network 110 is also coupled with/connected to a Trusted Search Server (TSS) which can be utilized to render content in accordance with the embodiments discussed herein. Embodiments exist where the TSS functionality can be embodied within servers 114, 116, and/or 118.

Moreover, although FIG. 1 illustrates servers 114, 116, and 118 as single computing devices, respectively, the disclosure is not so limited. For example, one or more functions of servers 114, 116, and/or 118 may be distributed across one or more distinct computing devices. Moreover, in one embodiment, servers 114, 116, and/or 118 may be integrated into a single computing device, without departing from the scope of the present disclosure.

Figure 2:
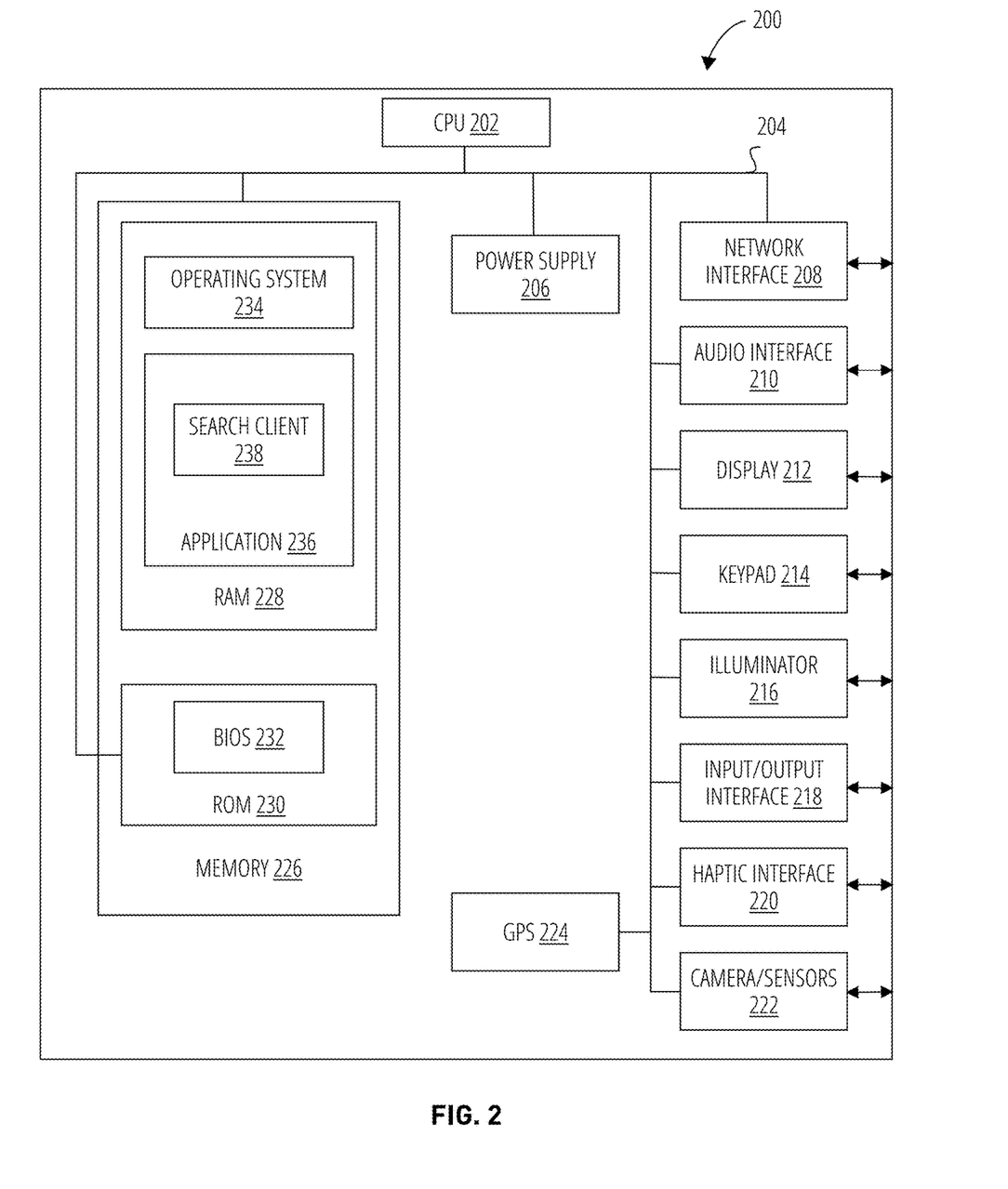
FIG. 2 depicts a schematic diagram illustrating an example of client device in accordance with some embodiments of the present disclosure.

FIG. 2 is a schematic diagram illustrating an example embodiment of a device 200 (e.g., a client device) that may be used within the present disclosure. Device 200 may include many more or less components than those shown in FIG. 2. However, the components shown are sufficient to disclose an illustrative embodiment for implementing the present disclosure. In some embodiments, device 200 may represent, for example, devices 114, 116, and/or 118 discussed above in relation to FIG. 1. In some embodiments, device 200 may represent, for example, devices 102-108 discussed above in relation to FIG. 1.

As shown in the figure, device 200 includes a processing unit (CPU) 202 in communication with a mass memory 226 via a bus 204. Device 200 also includes a power supply 206, one or more network interface 208, an audio interface 210, a display 212, a keypad 214, an illuminator 216, an input/output interface 218, a haptic interface 220, an optional global positioning systems (GPS) receiver 224 and a camera(s) or other optical, thermal or electromagnetic sensor 222. Device 200 can include one camera/sensor 222, or a plurality of cameras/sensors 222, as understood by those of skill in the art. Power supply 206 provides power to device 200.

Device 200 may optionally communicate with a base station (not shown), or directly with another computing device. Network interface 208 is sometimes known as a transceiver, transceiving device, or network interface card (NIC).

Audio interface 210 is arranged to produce and receive audio signals such as the sound of a human voice. Display 212 may be a liquid crystal display (LCD), gas plasma, light emitting diode (LED), or any other type of display used with a computing device. Display 212 may also include a touch sensitive screen arranged to receive input from an object such as a stylus or a digit from a human hand.

Keypad 214 may comprise any input device arranged to receive input from a user. Illuminator 216 may provide a status indication and/or provide light.

Device 200 also comprises input/output interface 218 for communicating with external. Input/output interface 218 can utilize one or more communication technologies, such as USB, infrared, Bluetooth™, or the like. Haptic interface 220 is arranged to provide tactile feedback to a user of the device.

Optional GPS transceiver 224 can determine the physical coordinates of device 200 on the surface of the Earth, which typically outputs a location as latitude and longitude values. GPS transceiver 224 can also employ other geo-positioning mechanisms, including, but not limited to, triangulation, assisted GPS (AGPS), E-OTD, CI, SAI, ETA, BSS or the like, to further determine the physical location of device 200 on the surface of the Earth. In one embodiment, however, device 200 may, through other components, provide other information that may be employed to determine a physical location of the device, including for example, a MAC address, Internet Protocol (IP) address, or the like.

Mass memory 226 includes a random-access memory (RAM) 228, a read-only memory (ROM) 230, and other storage means. Mass memory 226 illustrates another example of computer storage media for storage of information such as computer readable instructions, data structures, program modules or other data. Mass memory 226 stores a basic input/output system (BIOS) 232 for controlling low-level operation of device 200. The mass memory 226 also stores an operating system 234 for controlling the operation of device 200.

Mass memory 226 further includes one or more data stores, which can be utilized by device 200 to store, among other things, applications 236 and/or other information or data. For example, data stores may be employed to store information that describes various capabilities of device 200. At least a portion of the capability information may also be stored on a disk drive or other storage medium (not shown) within device 200.

Applications 236 may include computer executable instructions which, when executed by device 200, transmit, receive, and/or otherwise process audio, video, images, and enable telecommunication with a server and/or another user of another client device. Applications 236 may further include search client 238 that is configured to send, to receive, and/or to otherwise process a search query and/or search result.

Having described the components of the general architecture employed within the disclosed systems and methods, the components' general operation with respect to the disclosed systems and methods will now be described below.

Figure 3:
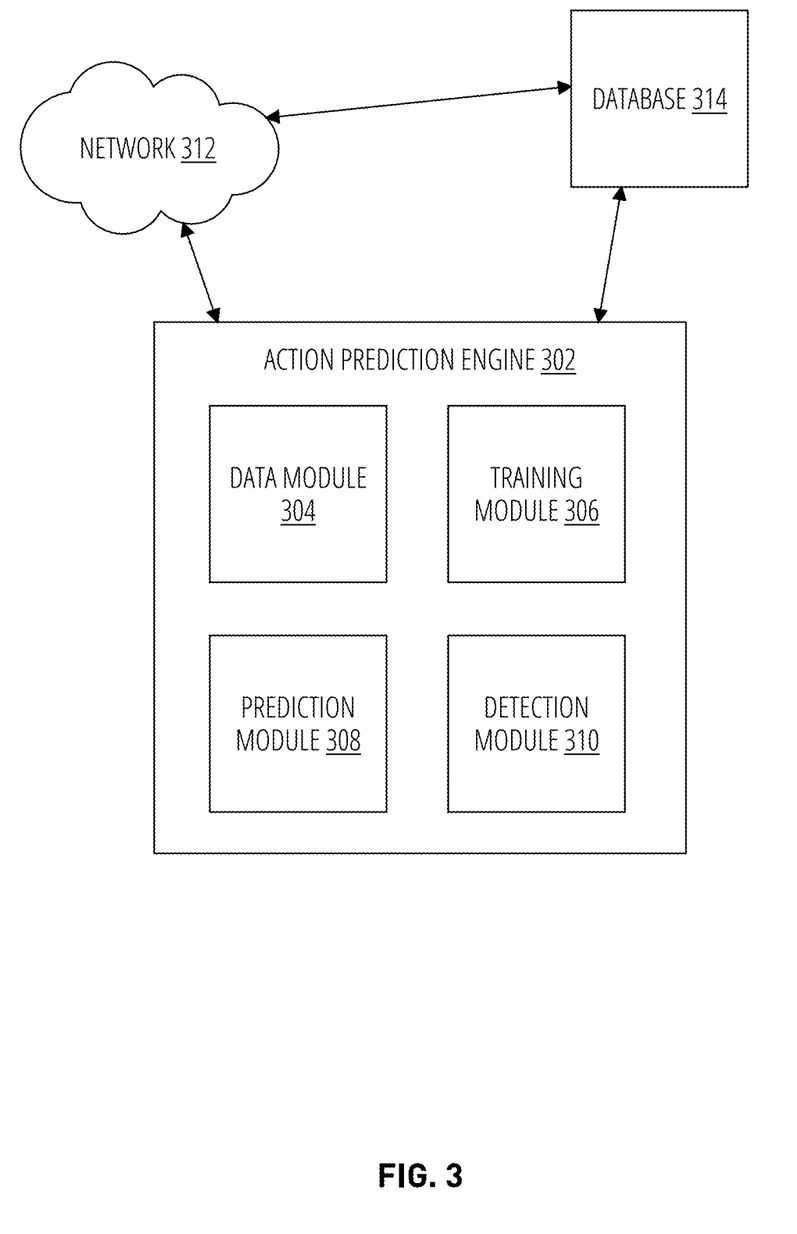
FIG. 3 is a block diagram illustrating components of an exemplary system in accordance with embodiments of the present disclosure.

FIG. 3 is a block diagram illustrating the components for performing the systems and methods discussed herein. FIG. 3 includes action prediction engine 302, network 312, and database 314. The action prediction engine 302 can be a special purpose machine or processor and could be hosted by a cloud server (e.g., cloud web services server(s)), messaging server, application server, content server, social networking server, web server, search server, content provider, third party server, user's computing device, and the like, or any combination thereof.

According to some embodiments, action prediction engine 302 can be a stand-alone application that executes on a user device. In some embodiments, action prediction engine 302 can function as an application installed on the user's device, and in some embodiments, such application can be a web-based application accessed by the user device over a network. In some embodiments, portions of the action prediction engine 302 function as an application installed on the user's device and some other portions can be cloud-based or web-based applications accessed by the user's device over a network, where the several portions of the action prediction engine 302 exchange information over the network. In some embodiments, the action prediction engine 302 can be installed as an augmenting script, program or application (e.g., a plug-in or extension) to another application or portable data structure.

The database 314 can be any type of database or memory, and can be associated with a content server on a network (e.g., content server, a search server or application server) or a user's device (e.g., client device 102-108 or device 200 from FIG. 1 and FIG. 2, respectively). In some embodiments, database 314 includes a dataset of data and metadata associated with local and/or network information related to users, services, applications, content and the like. In some embodiments, database 314 includes a dataset of data and metadata corresponding to messages in a messaging service. In a non-limiting embodiment, database 314 includes a corpus of messages containing a large number of messages (e.g., 10 million messages). In a non-limiting embodiment, database 314 includes a corpus of messages containing a large number of messages limited by a temporal threshold (e.g., 10 million messages corresponding to the last 7 days).

In some embodiments, such information can be stored and indexed in the database 314 independently and/or as a linked or associated dataset. As discussed above, it should be understood that the data (and metadata) in the database 314 can be any type of information and type, whether known or to be known, without departing from the scope of the present disclosure.

According to some embodiments, database 314 can store data for users, e.g., user data. According to some embodiments, the stored user data can include, but is not limited to, information associated with a user's profile, user interests, user behavioral information, user patterns, user attributes, user preferences or settings, user messages, user demographic information, user location information, user biographic information, and the like, or some combination thereof. In some embodiments, the user data can also include user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 314 can be any type of information related to a user, content, a device, an application, a service provider, a content provider, whether known or to be known, without departing from the scope of the present disclosure.

According to some embodiments, database 314 can store data and metadata associated with users, messages, images, videos, text, products, items and services from an assortment of media, applications and/or service providers and/or platforms, and the like. Accordingly, any other type of known or to be known attribute or feature associated with a message, data item, media item, login, logout, website, application, communication (e.g., a message) and/or its transmission over a network, a user and/or content included therein, or some combination thereof, can be saved as part of the data/metadata in datastore 314.

As discussed above, with reference to FIG. 1, the network 312 can be any type of network such as, but not limited to, a wireless network, a local area network (LAN), wide area network (WAN), the Internet, or a combination thereof. The network 312 facilitates connectivity of the action prediction engine 302, and the database of stored resources 314. Indeed, as illustrated in FIG. 3, the action prediction engine 302 and database 314 can be directly connected by any known or to be known method of connecting and/or enabling communication between such devices and resources.

The principal processor, server, or combination of devices that comprise hardware programmed in accordance with the special purpose functions herein is referred to for convenience as action prediction engine 302, and includes data module 304, training module 306, prediction module 308, and detection module 310. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Figure 4:
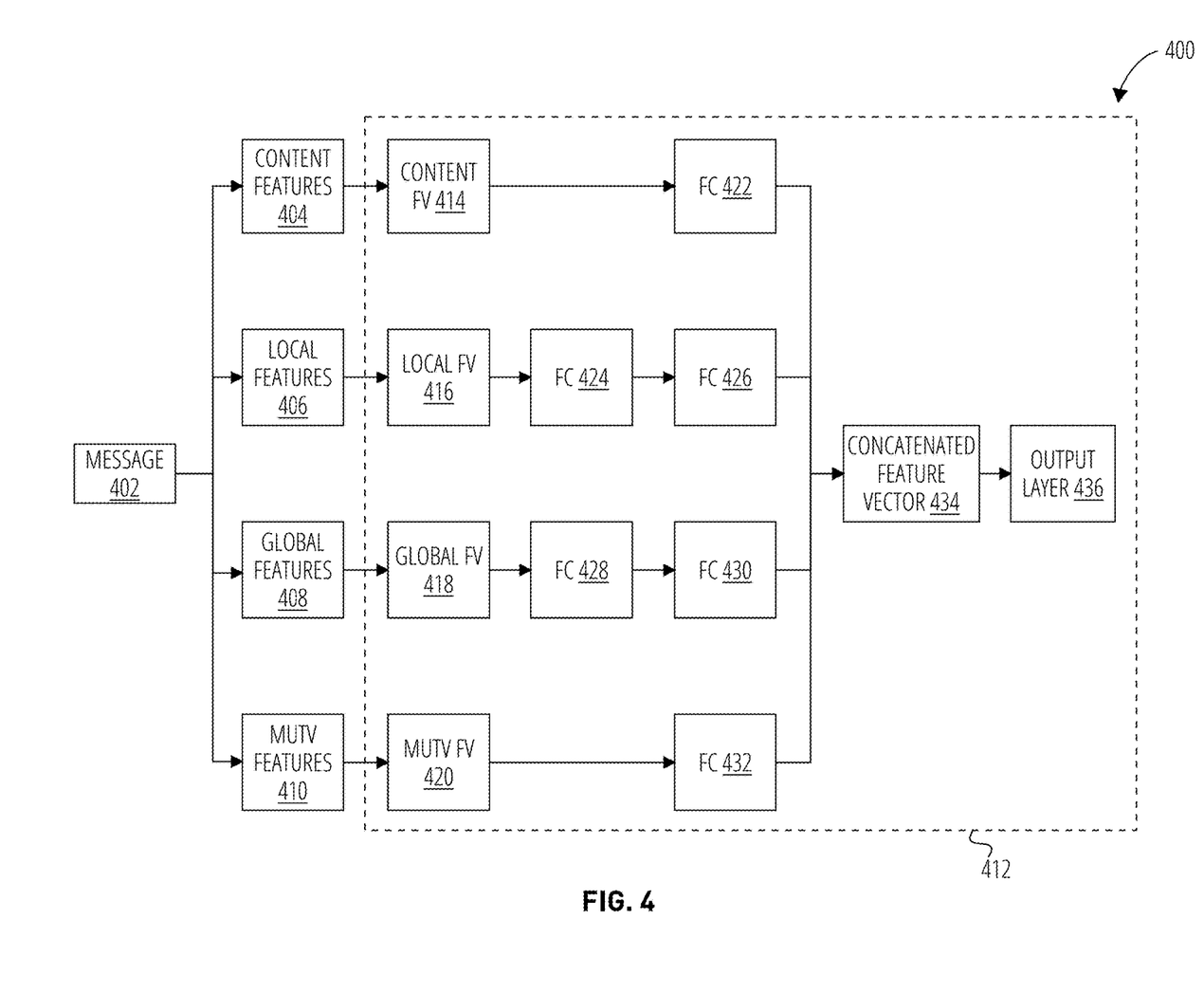
FIG. 4 illustrates a block diagram of an action prediction framework in accordance with some embodiments of the present disclosure.

FIG. 4 depicts a non-limiting example embodiment of action prediction framework 400. FIG. 4 depicts input message 402, features 404-410, and action prediction model 412. In some embodiments, action prediction model 412 includes some or all of feature vectors (FV) 414-420, fully connected (FC) layers 422-432, concatenated feature vector 434, and output layer 436. In some embodiments, the framework 400 includes at least one neural network. In some embodiments, the action prediction model 412 includes one or more simple neural networks, recurrent neural networks, convolutional neural networks, and generative adversarial networks.

As will be discussed with respect to FIG. 6, framework 400 may be used to predict which action (if any) a user might perform in response to receiving a given message (e.g., message 402). In some embodiments, the framework 400 may be used to suggest a predicted action to the user. In some embodiments, a computing device may use the predicted action to automatically perform the action. Therefore, in some embodiments, framework 400 may be referred to as a multi-label or multi-class classification framework, where the actions a user may perform in response to a given message are represented by labels or classes of the framework. In some embodiments, the framework 400 may not suggest a predicted action to the user. In some embodiments, the framework 400 may determine that no action may be suggested to the user.

According to an embodiment, for a given message 402, framework 400 can determine the probability that a user (e.g., sender, recipient) associated with the message 402 may perform an action or actions (e.g., open, forward, delete, reply, archive, or "no action") of a plurality of actions that may be performed with respect to the message 402. According to an embodiment, for a given message 402, framework 400 determines the probability that the user will perform a set of actions. In some embodiments, the plurality of actions may be performed by the user. In some embodiments, the plurality of actions may be performed by a computing device in response to a selection or command by the user. In some embodiments, the plurality of actions may be automatically performed by the computing device.

As will be discussed in further detail in relation to FIG. 6, framework 400 determines features 404-410, which can be a set of features identified, extracted and/or derived from a message 402, a collection of messages of a discrete user, and/or a corpus of messages. In some embodiments, message 402 may be an email, an SMS, a voice message, an instant message, and a direct message. According to an embodiment, framework 400 may extract content features 404, local features 406, global features 408, and mail-user-term-vector (MUTV) features 410. It will be understood that framework 400 may identify, extract and/or derive more or less features from message 402 without departing from the scope of the present disclosure.

In some embodiments, content features 404 may include message 402, data contained within message 402, and/or metadata of message 402.

In some embodiments, local features 406 may include features of a specific message, collection of messages of a specific user, and/or the user's inbox. In some embodiments, local features 406 may include historical data or features that represent a user's behavior. In a non-limiting example, local features 406 include historical user behavior and/or metadata of message 402.

In some embodiments, global features 408 may include features of a collection of messages or corpus of messages which may or may not include messages related to the user. In some embodiments, global features 408 may be sender-specific historical data or features that represent a sender's behavior.

In some embodiments, for features corresponding to historical data (which may also be referred to as temporal features), the historical data may be determined based on a predetermined or dynamically determined temporal threshold. In a non-limiting example, the temporal threshold is 35 days. In a non-limiting example, the temporal threshold is three months. In a non-limiting example, the temporal threshold is one year. In some embodiments, the temporal threshold may be based on a date associated to the message 402 (e.g., sent date, received date, opened date). In some embodiments, the temporal threshold may be based on a date associated to the user (e.g., last login). In some embodiments, the temporal threshold may be based on a characteristic of a collection of messages or corpus of messages. In a non-limiting example, the temporal threshold is the time prior to a date associated with message 402 within which a certain number of messages was received or collected (which may or may not be associated with the user). In some embodiments, a corpus of messages refers to some or all of the messages handled by a mail or communication service (e.g., Yahoo! Mail®, Gmail®, Instagram®, Snapchat®, and the like). In some embodiments, the temporal features may be normalized prior to integrating them into the framework 400.

In some embodiments, mail-user-term-vector (MUTV) features 410 represent a number of terms and associated numerical weights corresponding to terms from messages related to the user. In a non-limiting example, the MUTV features 410 represent terms and weight corresponding to terms from messages the user has interacted with. In some embodiments, the associated weights are calculated using a term frequency-inverse document frequency (TF-IDF) weighting scheme. Table 1 illustrates non-limiting examples of different features 404-410.

TABLE 1

| Feature Type | Description |
|---|---|
| Content features | Sender's name and/or address. Message subject. Message summary/snippet (given number of words on a message). |
| Local features | Number of days a user: opened messages, took an action, deleted messages, clicked on a message, opened notifications, replied to a message, and/or forwarded messages. Number of messages received by a user from a sender. Number of opened messages with different topics (e.g., travel, finance, etc.). For a given sender-user pair: open rate, number of messages open, number of clicks, number of notifications opened, number of messages deleted, number of actions, and/or number of messages in a thread. Type of message (e.g., whether machine generated or otherwise). For a given message: number of space separated terms in the subject, presence of attachment. |
| Global Features | For a given sender: overall open rate by recipients, number of sent messages, number of sent messages opened by recipients, number of sent messages clicked on by recipients, number of message notifications opened by recipients, number of messages deleted by recipients, and/or number of actions by recipients on messages. |

In some embodiments, each of features 404-410 is a set of features. For example, in some embodiments, content features 404 is a feature set including some or all of the content features summarized in Table 1. In some embodiments, local features 406 is a feature set including some or all of the local features summarized in Table 1. For example, in some embodiments, global features 418 is a feature set including some or all of the local features summarized in Table 1.

Returning to FIG. 4, according to some embodiments, extracted features 404-410 may be transformed into feature vectors 414-420. In some embodiments, feature vectors 414-420 may be referred to as inputs to action prediction model 412. In some embodiments, each of the extracted features 404-410 is transformed into a corresponding feature vector 414-420. In some embodiments, some extracted features 404-410 may be combined and transformed into corresponding feature vectors. For example, in an embodiment, local features 406 and global features 408 may be combined and transformed into a feature vector (e.g., local features vector 416 or global features vector 418).

In some embodiments, the feature vectors 414-420 may be normalized numerical vectors corresponding to some or all of the extracted features 404-410. In some embodiments, feature vectors 414-420 represent word embeddings vectors corresponding to some or all of extracted features 404-410. It will be understood that while reference is made to vectors, embodiments described herein may also use matrices. In some embodiments, feature vectors 414-420 are generated using a pre-trained word embeddings algorithm on the extracted features 404-410. In some embodiments, pre-trained word embeddings algorithm may be trained on a large corpus of messages that may or may not be related to a given user. In some embodiments, the pre-trained word embeddings algorithm may be a known (e.g., fastText) or to be known algorithm without departing from the scope of the present disclosure.

In some embodiments, feature vectors 414-420 may be further processed. In an embodiment, generated word embeddings may be averaged over each related extracted feature from some or all of extracted features 404-410 and then concatenated to form a single vector. In a non-limiting example, content features vector 414 may be generated by averaging the word embeddings corresponding to the content features 404 over each content feature of the content features 404. Then, the averages are concatenated to form content features vector 414. In an embodiment, generated word embeddings may be weighted using pre-determined weights and/or dynamically determined weights associated with the extracted features 404-410. Then, the weighted word embeddings may be averaged to generate the feature vector. In a non-limiting example, the word embeddings related to the MUTV features 410 and the weights are weights related to the MUTV features 410, as discussed above.

According to some embodiments, feature vectors 414-420 may be connected to one or more fully connected layers 422-432. While not shown, in some embodiments, feature vectors 414-420 may be combined into a single vector and connected to one or more fully connected layers 422-432. As shown in FIG. 4, in some embodiments, each content feature vector 414-420 may be connected to a corresponding fully connected layer (e.g., content features vector 414 to fully connected layer 422, local features vector 416 to fully connected layer 424, global features vector 418 to fully connected layer 428, and MUTV FV 420 to fully connected layer 432. Still, in some embodiments, fully connected layers 422-432 may be a single fully connected layer. In some embodiments, fully connected layers 422-432 may be a plurality of layers arranged in series, in parallel, and/or a combination of both.

In some embodiments, some or all of the fully connected layers 422-432 may also be connected to at least one other fully connected layer 422-432. For example, in the non-limiting embodiment shown in FIG. 4, fully connected layer 424 is connected to fully connected layer 426 and fully connected layer 428 is connected to fully connected layer 430. As will be understood by those skilled in the art, fully connected layers 422-432 may include a plurality of neurons. In some embodiments, the plurality of neurons for each fully connected layer may be determined by the number of features in each of the features 404-410. In some embodiments, the plurality of neurons for each fully connected layer may be determined by the number of labels or classes of the action prediction model 412. For example, in an embodiment, fully connected layers 422-432 may have 256, 128, 64, 32, and 16 neurons. In some embodiments, two consecutive fully connected layers may have the same number of neurons. For example, in a non-limiting embodiment, fully connected layer 424 and fully connected layer 426 may have the same number of neurons. For example, in another non-limiting embodiment, fully connected layer 428 and fully connected layer 430 may have the same number of neurons. As will be understood, in some embodiments, each neuron may have an activation function and/or associated weights.

In some embodiments, some or all of the fully connected layers 422-432 may generate a fully connected layer output. In some embodiments, some or all of the fully connected layer outputs may be concatenated to generate feature vector 434. In some embodiments, some or all of the fully connected layer outputs are a result of propagating the feature vectors 414-420 through the corresponding fully connected layers 422-432. As will be understood, propagating a vector through a fully connected layer may include performing at least one mathematical operation on the vector (e.g., multiplication).

Returning to FIG. 4, in some embodiments, some or all of the fully connected layers 422-432 may be concatenated to create one or more concatenated feature vector 434. In some embodiments, concatenated feature vector 434 may be a final layer of a neural network. According to an embodiment, the concatenated feature vector 434 may be processed to generate an output layer 436 of the action prediction model 412. In some embodiments, output layer 436 may be referred to as an activation layer. In some embodiments, output layer 436 includes a determination of an action or set of actions to be performed corresponding to message 402. In some embodiments, output layer 436 is a list of actions. In some embodiments, output layer 436 is a list of actions associated with a probability score reflecting the likelihood that a user will perform or will want to perform a given action in response to message 402. In some embodiments, "no action" may be one of the actions to be performed in relation to message 402. In some embodiments, output layer 436 includes a determination that "no action" be performed in relation to message 402. In those embodiments, framework 400 may not generate a suggestion in response to receiving a given message. In some embodiments, output layer 436 is a list of actions associated with a sigmoid score calculated using a sigmoid function. In some embodiments, output layer 436 is a list of actions with an associated sigmoid score above a predetermined threshold. In some embodiments, no actions have an associated sigmoid score above the predetermined threshold. In those embodiments, framework 400 may not generate a suggestion in response to receiving a given message.

Figure 5:
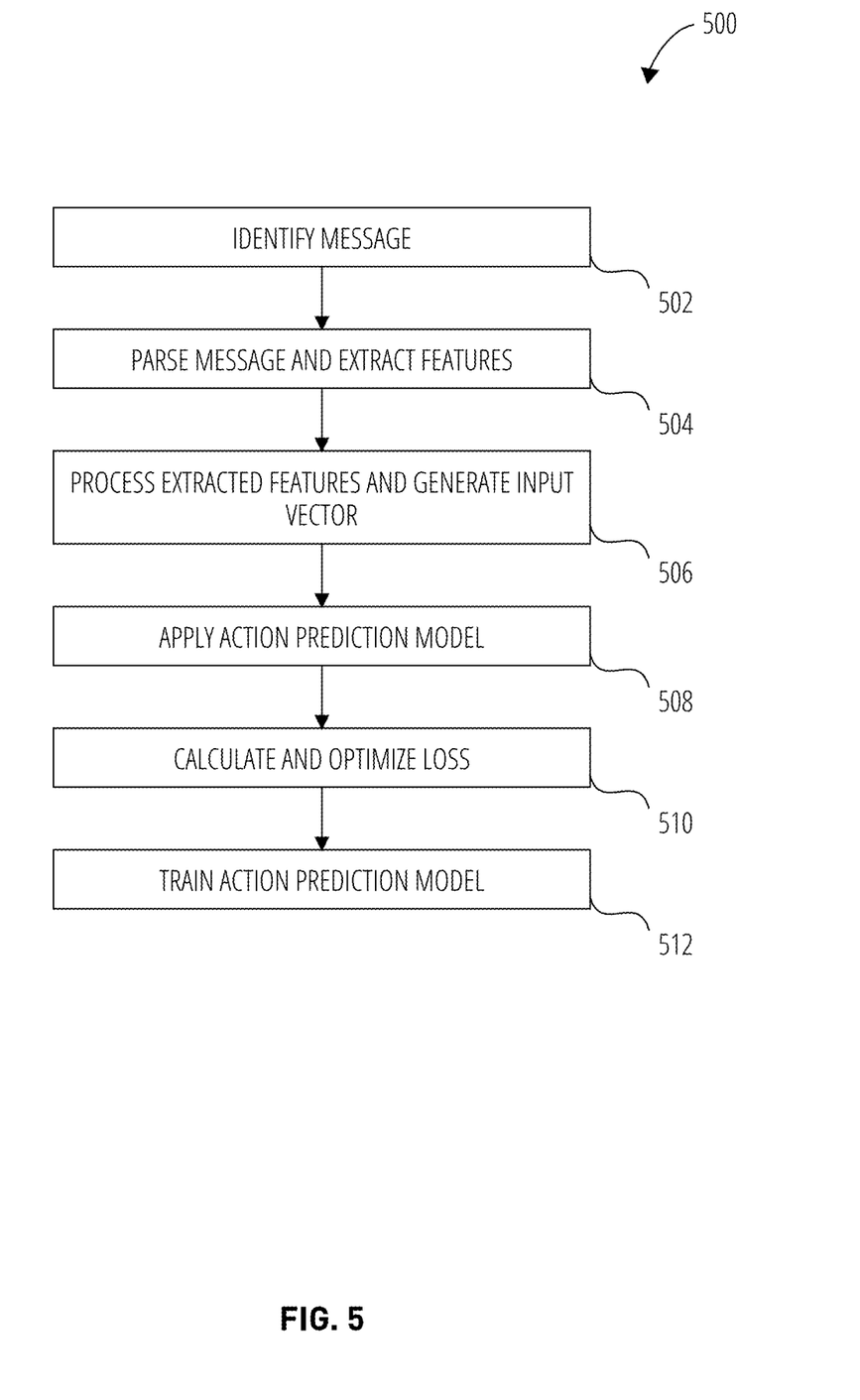
FIG. 5 illustrates a process for training an action prediction model according to some embodiments of the present disclosure.

Turning to FIG. 5, process 500 details non-limiting embodiments for training an action prediction model (e.g., action prediction model 412). The training steps of Process 500 correspond to the data flow within the framework discussed above in relation to FIG. 4. According to some embodiments, Steps 502-506 of Process 500 may be performed by data module 304 of action prediction engine 302; and Steps 508-512 may be performed by training module 306.

Process 500 begins with Step 502 where a message is identified. While the discussion herein will be based on a single message, it should not be construed as limiting, as the identified message can be a plurality of messages, and one of skill in the art would understand that the scope of the present disclosure would remain unchanged. In some embodiments, the message is a given message of a training dataset where the training dataset includes messages, known features of each of the messages, and associated known actions a user or a plurality of users performed related to each of the messages.

According to some embodiments, the message can be any type of known or to be known message, communications, or item which two or more users may use to communicate, such as, but not limited to, images, videos, audio, text, a social media post or webpage, a website, a multimedia object, and the like, or some combination thereof. According to some embodiments, the message may be a type of digital communication content that can be visibly displayed and/or rendered on a webpage, user interface (UI), or browser UI.

In Step 504, the identified message is analyzed in order to identify and/or extract features (or characteristics or attributes, used interchangeably) that relate to the message and/or users interactions therewith. In some embodiments, Step 504's analysis involves parsing the message and identifying and/or extracting information related to a set of features. In some embodiments, the result of Step 504 is extracted features 404-410 discussed in relation to FIG. 4. As noted above, it should be understood that the features extracted from the message are not limited to the features discussed herein, as any type of known or to be known feature, whether extracted, modified or unmodified, or compiled can be utilized without departing from the scope of the instant disclosure.

According to some embodiments, the analysis and feature extraction performed in Step 504 can be performed by action prediction engine 302 executing any type of known or to be known computational analysis technique, algorithm or artificial intelligence or machine learning mechanism, such as, but not limited to, computer vision, neural networks, data mining, feature extraction, and the like.

Process 500 then proceeds to Step 506, where action prediction engine 302 processes the extracted features to generate an input vector. In some embodiments, the result of Step 506 is feature vectors 414-420 discussed in relation to FIG. 4.

Turning to Step 508, action prediction engine 302 applies an action prediction model to the extracted features. The functionality, application and result of such an action prediction model is discussed above in relation to the action prediction model 412 of FIG. 4. The result of Step 508 is action prediction engine 302 determining an action prediction model output. In some embodiments, an action prediction model has a plurality of sub-models, where a sub-model corresponds to one or more of the extracted features. In those embodiments, the results of each sub-model are combined (e.g., concatenated) to produce an action prediction model output.

In Step 510, training module 306 analyzes the output or outputs of Step 508 to determine a loss of the action prediction module based on the known extracted features and/or known actions related to the identified message from the training dataset. In some embodiments, calculating the loss involves calculating a binary or sigmoid cross-entropy loss. In some embodiments, training module 306 may also employ an optimizer to optimize at least one parameter of the action prediction model. For example, in an embodiment, the optimizer is the Adam optimizer with a learning rate of 0.001, a batch size of 100, and a runtime of 3 epochs.

Based on the output of Step 510, in Step 512, training module 306 trains the action prediction module by updating the at least one parameter of the action prediction module. In an embodiment, the output of Step 510 is a trained action prediction model. In some embodiments, action prediction model 412 is a trained action prediction model.

Figure 6:
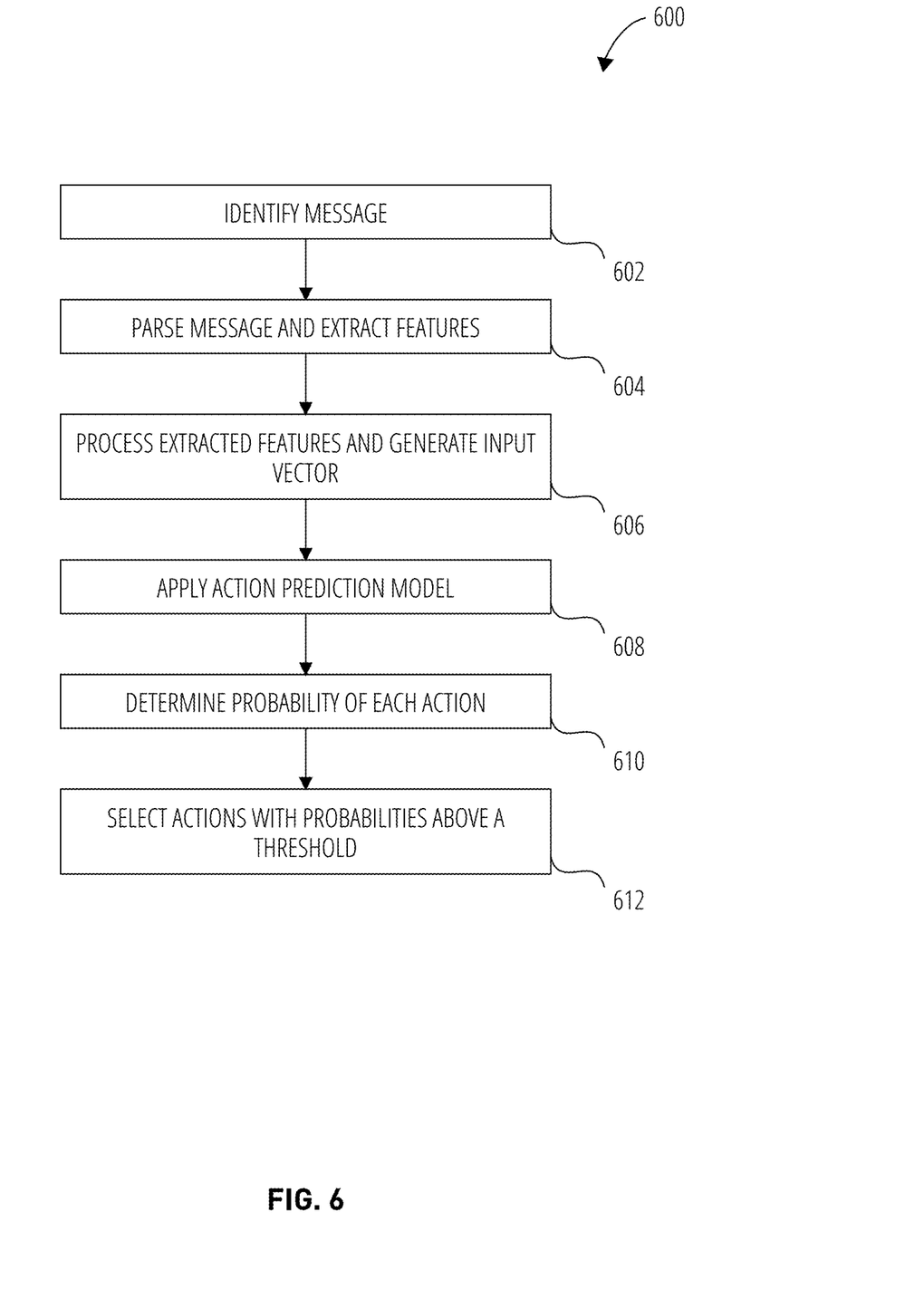
FIG. 6 illustrates a process for performing scalable action prediction using a trained action prediction model according to some embodiments of the present disclosure.

Turning to FIG. 6, Process 600 details non-limiting embodiments for performing scalable action prediction using a trained action prediction model (e.g., action prediction model 412). The steps of Process 600 correspond to the data flow within the framework discussed above in relation to FIG. 4. As noted elsewhere, according to an embodiment, Process 600 determines the probability a user will perform an action or set of actions in response to a given message (e.g., message 402). According to an embodiment, process 600 determines the probability a user will perform an action or set of actions in response to a given message (e.g., message 402) and suggest the action or the set of actions to the user. According to some embodiments, Steps 602-606 of Process 600 may be performed by data module 304 of action prediction engine 302; and Steps 608-612 may be performed by prediction module 308, detection module 310, or a combination of both.

Process 600 of FIG. 6 begins with Step 602 where prediction module 308 identifies and retrieves a message from database 314 (e.g., message 402). As noted above, while discussion herein will be based on a single message, it should not be construed as limiting, as the identified message can be a plurality of messages, and one of skill in the art would understand that the scope of the present disclosure would remain unchanged. In some embodiments, the message is a given message of a corpus of messages (e.g., a user's email inbox, all messages handled by an email service).

Also as noted above, according to some embodiments, the message can be any type of known or to be known message, communications, or item which two or more users may use to communicate, such as, but not limited to, images, videos, audio, text, a social media post or webpage, a website, a multimedia object, and the like, or some combination thereof. According to some embodiments, the message may be a type of digital communication content that can be visibly displayed and/or rendered on a webpage, user interface (UI), or browser UI.

In Step 604, the identified message is analyzed in order to identify and/or extract features of the message. In some embodiments, Step 604's analysis involves parsing the message and identifying and/or extracting information related to a set of features (e.g., features discussed in relation to Table 1). In some embodiments, the result of Step 604 is extracted features 404-410 discussed in relation to FIG. 4. As noted above, it should be understood that the features extracted from the message are not limited to the features discussed herein, as any type of known or to be known feature, whether extracted, modified or unmodified, or compiled can be utilized without departing from the scope of the instant disclosure.

According to some embodiments, the feature extraction performed in Step 604 can be performed by action prediction engine 302 executing any type of known or to be known computational analysis technique, algorithm or artificial intelligence or machine learning mechanism, such as, but not limited to, computer vision, neural networks, data mining, feature extraction, and the like.

Process 600 then proceeds to Step 606, where data module 304 processes the extracted features to generate a feature vector (e.g., feature vectors 414-420). In Step 608, the data module 304 provides the extracted feature vectors to the prediction module 308, the detection module 310, or a combination thereof. In some embodiments, the prediction module 308 applies the trained action prediction model (e.g., the result of Process 500 discussed in relation to FIG. 5) to the feature vector. In some embodiments, Step 608 results in a vector representing a set of actions and corresponding scores representing the likelihood a user would perform each action with respect to the identified message.

In some embodiments, in optional Step 610, the scores corresponding to the actions are converted to probabilities using a sigmoid function. In Step 612, action prediction engine 302 selects a subset of the actions from Step 608 or Step 610. In some embodiments, the subset of actions includes all actions that meet or exceed a predetermined threshold. In some embodiments, the predetermined threshold is arbitrarily selected (e.g., 50%, 75%). In some embodiments, the predetermined threshold is the average of the probabilities of some or all of the actions. In some embodiments, the predetermined threshold is the mean of the probabilities of some or all of the actions. In some embodiments, the predetermined threshold is the median of the probabilities of some or all of the actions. In some embodiments, the predetermined threshold is determined by removing actions with probabilities that are outliers and calculating one of an average, a mean, and a median of the remaining actions.

In some embodiments, for example, an application implementing the action prediction engine 302 may suggest that the user perform some or all of the actions in the subset of actions. In some embodiments, for example, an application implementing the action prediction engine 302 may automatically perform some or all of the actions in the subset of actions (e.g., delete a message, report as junk).

According to an embodiment, a computing device may implement action prediction engine 302 as part of a messaging system (e.g., e.g., Yahoo! Mail®, Gmail®, and the like). As such, the computing device may receive requests from other devices (e.g., client device) to provide a message (e.g., through a web portal or a web page). In some embodiments, the computing device may receive a request to provide a message through an application programming interface (API). In response to the request, the computing device may provide (e.g., through the web page or API) the message and an action or set of actions identified in Step 612 of Process 600. In some embodiments, the client device requesting the message may display the message and the action or set of actions to a user of the client device through a display of the client device. In some embodiments, the client device displays the message and/or the action or set of actions in a prompt. In turn, the user may select the action, the set of actions, or a subset of actions from the set of actions. Then, the client device may send the selection to the computing device. Similarly, the computing device may receive the selection and perform the selected action, set of actions, or subset of actions from the set of actions.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may exist in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extent or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A method comprising:
   identifying a message related to a user;
   analyzing the message to extract at least one feature;
   applying an action prediction model to the at least one feature, the action prediction model including at least one fully connected layer corresponding to each of the plurality of feature sets, such that applying the action prediction model comprises:
      processing the plurality of feature sets to generate a plurality of corresponding feature vectors;
      propagating each of the feature vectors through the at least one corresponding fully connected layer to generate a plurality of layer outputs;
      concatenating all the layer outputs into an output vector; and
      applying an activation function to the output vector;
   determining an output of the action prediction model, the output including at least one action in relation to the message; and
   causing display of the message and the output within a user interface (UI), the display enabling automatic execution of the at least one action in relation to the message.

2. The method of claim 1, wherein the at least one feature is a feature chosen from a group of features consisting of a local feature, a global feature, a content feature, and a mail-user-term-vector (MUTV) feature.

3. The method of claim 2, wherein the at least one local feature is a feature associated with a recipient of the message; and the at least one global feature is a feature associated with a sender of the message.

4. The method of claim 2, wherein the at least one content feature is a feature associated with data and metadata of the message.

5. The method of claim 1, further comprising:
receiving a request to provide the message;
providing the message and the at least one action;
receiving a selection to perform the at least one action; and
performing the at least one action.

6. The method of claim 1, wherein the action prediction model is a trained action prediction model, and training the action prediction model comprises:
identifying a training message and at least one associated known action from a training dataset;
analyzing the training message to extract at least one training message feature;
applying the action prediction model to the at least one training message feature;
determining an output of the action prediction model, the output including at least one predicted action that may be performed in relation to the training message;
calculating a loss of the action prediction model based on the at least one predicted action and the at least one associated known action; and
generating the trained action prediction model by updating the action prediction model based on the calculated loss.

7. The method of claim 6, wherein the action prediction model comprises a plurality of layers associated with the at least one training message feature.

8. A non-transitory computer-readable storage medium, the computer-readable storage medium including instructions that when executed by a computing device, cause the computing device to:
identify a message related to a user;
analyze the message to extract at least one feature;
apply an action prediction model to the at least one feature, the action prediction model including at least one fully connected layer corresponding to each of the plurality of feature sets, such that applying the action prediction model comprises:
processing the plurality of feature sets to generate a plurality of corresponding feature vectors;
propagating each of the feature vectors through the at least one corresponding fully connected layer to generate a plurality of layer outputs;
concatenating all the layer outputs into an output vector; and
applying an activation function to the output vector;
determine an output of the action prediction model, the output including at least one action in relation to the message; and
cause display of the message and the output within a user interface (UI), the display enabling automatic execution of the at least one action in relation to the message.

9. The computer-readable storage medium of claim 8, wherein the at least one feature is a feature chosen from a group of features consisting of a local feature, a global feature, a content feature, and a MUTV feature.

10. The computer-readable storage medium of claim 9, wherein the at least one local feature is a feature associated with a recipient of the message; and the at least one global feature is a feature associated with a sender of the message.

11. The computer-readable storage medium of claim 9, wherein the at least one content feature is a feature associated with a data and metadata of the message.

12. The computer-readable storage medium of claim 8, wherein the instructions further cause the computing device to:
receive a request to provide the message;
provide the message and the at least one action;
receive a selection to perform the at least one action; and
perform the at least one action.

13. The computer-readable storage medium of claim 8, wherein the action prediction model is a trained action prediction model, and wherein the instructions further cause the computing device to:
identify a training message and at least one associated known action from a training dataset;
analyze the training message to extract at least one training message feature;
apply the action prediction model to the at least one training message feature;
determine an output of the action prediction model, the output including at least one predicted action that may be performed in relation to the training message;
calculate a loss of the action prediction model based on the at least one predicted action and the at least one associated known action; and
generate the trained action prediction model by updating the action prediction model based on the calculated loss.

14. The computer-readable storage medium of claim 13, wherein the action prediction model comprises a plurality of layers associated with the at least one training message feature.

15. A computing device comprising:
a processor configured to:
identify a message related to a user;
analyze the message to extract at least one feature;
apply an action prediction model to the at least one feature, the action prediction model including at least one fully connected layer corresponding to each of the plurality of feature sets, such that applying the action prediction model comprises:
processing the plurality of feature sets to generate a plurality of corresponding feature vectors;
propagating each of the feature vectors through the at least one corresponding fully connected layer to generate a plurality of layer outputs;
concatenating all the layer outputs into an output vector; and
applying an activation function to the output vector;
determine an output of the action prediction model, the output including at least one action in relation to the message; and
cause display of the message and the output within a user interface (UI), the display enabling automatic execution of the at least one action in relation to the message.

16. The computing device of claim 15, wherein the at least one feature is a feature chosen from a group of features consisting of a local feature, a global feature, a content feature, and a MUTV feature.

17. The computing device of claim 15, the processor is further configured to:
receive a request to provide the message;
provide the message and the at least one action;
receive a selection to perform the at least one action; and
perform the at least one action.

18. The computing device of claim 15, wherein the action prediction model is a trained action prediction model, the processor further configured to:
identify a training message and at least one associated known action from a training dataset;
analyze the training message to extract at least one training message feature;

apply the action prediction model to the at least one training message feature;
determine an output of the action prediction model, the output including at least one predicted action that may be performed in relation to the training message;
calculate a loss of the action prediction model based on the at least one predicted action and the at least one associated known action; and
generate the trained action prediction model by updating the action prediction model based on the calculated loss.

* * * * *